Dec. 29, 1931.  C. PEARSON  1,838,442
DRAFT POLE
Filed Oct. 14, 1929  2 Sheets-Sheet 1
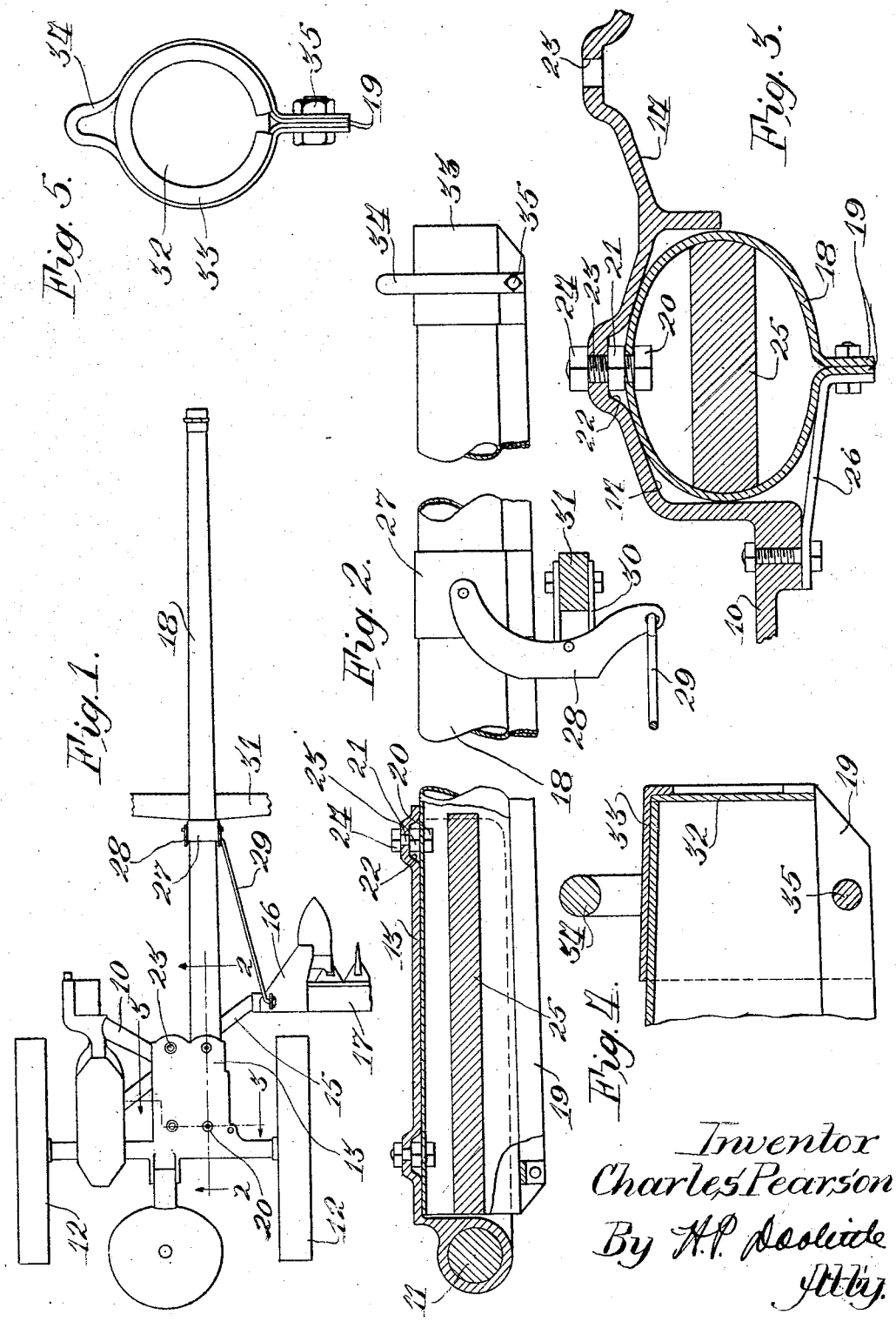
Inventor
Charles Pearson
By H.P. Doolittle
Atty.

Dec. 29, 1931.   C. PEARSON   1,838,442
DRAFT POLE
Filed Oct. 14, 1929   2 Sheets-Sheet 2

Inventor
Charles Pearson
By *[signature]*
Atty.

Patented Dec. 29, 1931

1,838,442

UNITED STATES PATENT OFFICE

CHARLES PEARSON, OF CHICAGO, ILLINOIS, ASSIGNOR TO INTERNATIONAL HARVESTER COMPANY, A CORPORATION OF NEW JERSEY

DRAFT POLE

Application filed October 14, 1929. Serial No. 399,416.

This invention relates to draft poles or tongues.

Primarily, the pole is designed for wheeled implements, such, for example, as mowers. Other objects of the invention are to provide a light, strong draft pole or tongue; to provide such a device formed of sheet metal; to provide such a device which may be readily attached to the implement to be drawn; and, lastly, to provide such a device to which various draft fixtures and appliances may be readily connected.

These desirable obects are accomplished in the structure of the invention presently to be described. One form of the same may be as illustrated in the drawings, showing an all metal pole of tubular form which tapers to impart thereto graduated flexibility and strength. A strengthening rib runs the length of the tongue and serves as a means of connection for various draft appliances. A simple connecter means is carried by the larger end of the tongue for connection to the frame of the implement to be pulled.

Referring now to the drawings illustrating forms of the invention, by way of example, it will be seen that:

Figure 1 is a general plan view of a mower with the improved draft pole mounted thereon;

Figure 2 is a general side elevational view of the mower frame and draft pole connected thereto, on an enlarged scale, a part of the view being in longitudinal section as viewed along the line 2—2 in Figure 1;

Figure 3 is a cross sectional view taken along the line 3—3 appearing in Figure 1;

Figure 4 is a vertical longitudinal sectional view through the tip of the pole;

Figure 5 is an end view of the pole tip;

Figure 6:
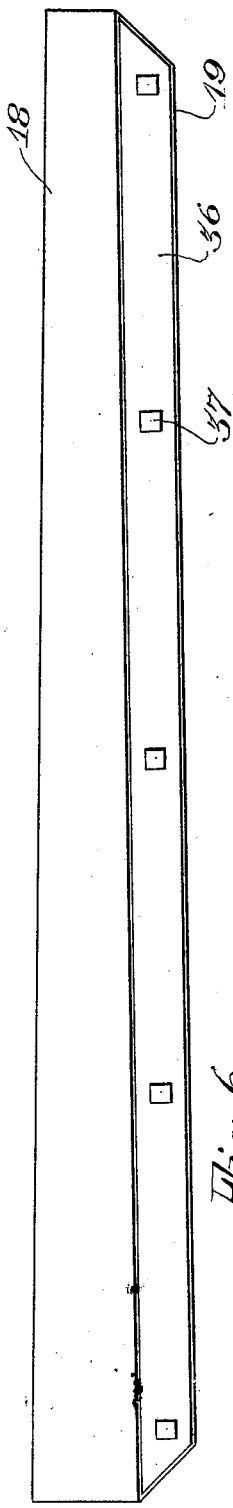
Figure 6 is a general side, elevational view of the pole, showing a modified construction.

To illustrate the use of the improved draft pole, a mower has been shown in Figure 1, comprising a main frame 10, axle 11, and carrying wheels 12. The frame includes an inverted part 13 providing two pole sockets 14. The mower also includes the usual coupling arm 15, yoke 16, and cutter bar 17.

The draft pole appears at 18 and comprises, as best shown in Figures 2, 3 and 5, a sheet metal blank formed into the tubular, tapered shape shown. In one form, (see Figures 1, 2, 3 and 4), the pole is elliptical in cross section at one end, and tapers at its free end to circular shape, in cross section, as is shown in Figure 5. The two side edges of the blank, as shown at 19, are folded outwardly and flatly against each other to form a continuous rib along the under side of the pole to strengthen the same, and to serve as a convenient means to receive draft appliances or other fixtures, as desired. These two end flanges forming the rib 19 are preferably welded together in practice.

At two spaced points along its top side and toward its rear end, the pole carriers headed bolts 20, the shanks of said bolts projecting upwardly through the pole top side and held in place by nuts 21 which are adapted to nest in pockets 22 formed in the frame part 13. The bolt shanks are adapted to be passed upwardly through openings 23 in the pockets 22. Nuts 24 are then provided securely to hold the pole in its pocket 14 on the main frame of the implement. A wood core 25 helps to maintain the shape of the pole under stress and prevents the bolts 20 from dropping into the interior of the tongue when, for example, the nuts 21, 24 are removed.

If desired, a brace 26 may be bolted to the rib 19 and to the frame part 13, as shown in Figure 3, to strengthen the pole mounting additionally.

Intermediately of its ends, the pole has secured thereto, as by welding, a sleeve 27 which pivotally carries a depending bracket 28 that has a pull connection with the mower coupling yoke 16 by means of the coupling link 29. See Figures 1 and 2. Pivotally connected to this bracket 28 are the clevises 30 which carry the whipple-trees 31 for connection of draft animals.

The open front end of the pole is closed by a circular disk 32 which is held in place by a flanged sleeve 33, also preferably welded fast to the pole. A neck yoke ring 34 embraces the sleeve and may be secured therearound by means of the bolts 35 passed through the rib 19. See Figures 4 and 5.

In Figure 6, the pole appears at 18 again, but it is to be noted that the rib flanges have been strengthened by securement thereto of strips 36. See also Figure 8. Bolts and nuts 37 may be employed to secure the strips 36 to the rib 19.

Figure 7:
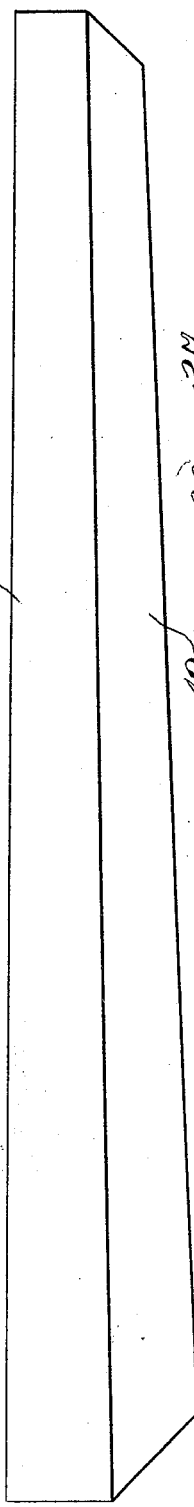
Figure 7 is similar to Figure 6, showing still another modification.

In Figure 7, the rib 19 is tapered to impart to it a graduated strength, the rib being wider as it approaches the rear end of the pole.

Figure 8:
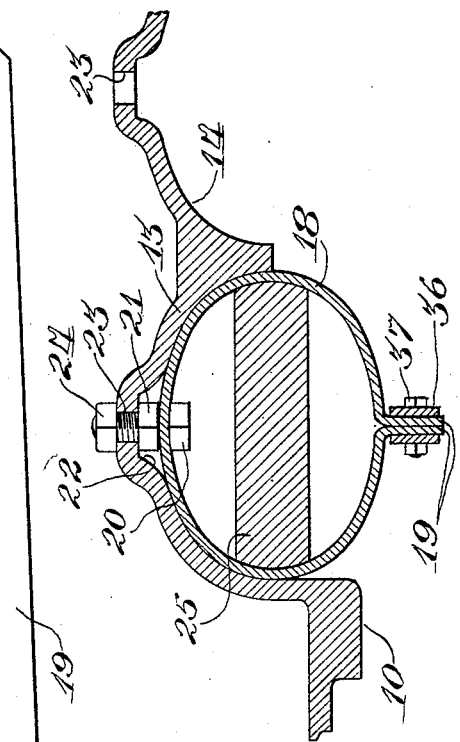
Figure 8 is a view similar to Figure 3, showing a slight modification.

In Figure 8 is shown a modification of the pole receiving pockets 14 in the frame member 13, said pockets being rounded closely to fit and conform with the shape of the pole, as shown. This structure would eliminate the necessity of using a brace 26 like that illustrated in Figure 3.

From the above detailed disclosure, the use and constructions of the improved draft pole will be clear; also, it will be apparent that the same achieves all of the desirable objects heretofore mentioned.

It is the intention to cover all changes and modifications that do not materially depart from the spirit and scope of the invention as defined in the following claims.

What is claimed is:

1. Means for securing a hollow draft pole to a vehicle frame having a pole receiving socket formed with a raised pocket, a headed bolt passed through the pole and having its shank projected out through the pocket, the head of the bolt located inside the hollow pole, a nut on the bolt shank inside said pocket, and a securing nut on the projected end of the bolt shank.

2. Means for securing a hollow draft pole to a vehicle frame having a pole receiving socket formed with a raised pocket, a headed bolt passed through the pole and having its shank projected out through the pocket, the head of the bolt located inside the hollow pole, a nut on the bolt shank inside said pocket, a securing nut on the projected end of the bolt shank, and a horizontally disposed core within the socket end of the pole arranged beneath the head of said bolt.

In testimony whereof I affix my signature.

CHARLES PEARSON.